(12) United States Patent
Halliburton

(10) Patent No.: US 10,709,958 B1
(45) Date of Patent: Jul. 14, 2020

(54) SPORT BOARD

(71) Applicant: Cross Wing Technology Holdings, LLC, Avondale, AZ (US)

(72) Inventor: Duncan Halliburton, Newport Beach, CA (US)

(73) Assignee: CROSS WING TECHNOLOGY HOLDINGS, LLC, Avondale, AZ (US)

( * ) Notice: Subject to any disclaimer, the term of this patent is extended or adjusted under 35 U.S.C. 154(b) by 0 days.

(21) Appl. No.: 16/380,723

(22) Filed: Apr. 10, 2019

Related U.S. Application Data

(60) Provisional application No. 62/800,962, filed on Feb. 4, 2019.

(51) Int. Cl.
| | | |
|---|---|---|
| *A63C 17/01* | (2006.01) | |
| *B32B 15/20* | (2006.01) | |
| *B32B 3/12* | (2006.01) | |
| *B32B 15/14* | (2006.01) | |
| *A63C 17/14* | (2006.01) | |

(52) U.S. Cl.
CPC ............ *A63C 17/01* (2013.01); *A63C 17/012* (2013.01); *A63C 17/017* (2013.01); *A63C 17/1436* (2013.01); *B32B 3/12* (2013.01); *B32B 15/14* (2013.01); *B32B 15/20* (2013.01)

(58) Field of Classification Search
CPC ... A63C 5/003; A63C 5/04–056; A63C 17/01; A63C 17/017
See application file for complete search history.

(56) References Cited

U.S. PATENT DOCUMENTS

| 5,033,765 | A | * | 7/1991 | Cagneux | ................ | A63C 5/075 |
| | | | | | | 280/602 |
| 5,303,948 | A | * | 4/1994 | Le Masson | .............. | A63C 9/00 |
| | | | | | | 280/602 |
| 5,393,086 | A | * | 2/1995 | Le Masson | .............. | A63C 5/07 |
| | | | | | | 280/602 |
| 5,544,908 | A | * | 8/1996 | Fezio | ..................... | A63C 5/044 |
| | | | | | | 264/257 |
| 5,803,478 | A | * | 9/1998 | Gavalis | .................... | A63C 5/07 |
| | | | | | | 280/601 |
| 6,056,311 | A | * | 5/2000 | Leung | ....................... | B63B 1/20 |
| | | | | | | 280/609 |
| 8,246,070 | B2 | * | 8/2012 | Lin | .......................... | A63C 5/03 |
| | | | | | | 280/11.14 |
| 9,308,432 | B1 | * | 4/2016 | Olson | .................... | A63C 5/048 |
| 9,744,430 | B2 | * | 8/2017 | Hill | ........................ | B32B 15/20 |
| 2006/0049596 | A1 | * | 3/2006 | Hill | ........................ | A63C 17/01 |
| | | | | | | 280/87.042 |
| 2006/0097469 | A1 | * | 5/2006 | Nosworthy | ............ | B29C 70/48 |
| | | | | | | 280/87.042 |
| 2006/0178061 | A1 | * | 8/2006 | Caldwell | ................. | B63B 32/50 |
| | | | | | | 441/74 |
| 2006/0276087 | A1 | * | 12/2006 | Conner, Jr. | ............... | B32B 5/26 |
| | | | | | | 441/74 |
| 2009/0191989 | A1 | * | 7/2009 | Lammer | ................ | A63B 60/00 |
| | | | | | | 473/535 |

(Continued)

*Primary Examiner* — Erez Gurari
(74) *Attorney, Agent, or Firm* — Lewis Brisbois Bisgaard & Smith, LLP

(57) ABSTRACT

A sport board or freestyle skateboard which may include at least a central aluminum honeycomb portion between layers of carbon nanotube fiber, fiberglass cloth, and covered with a soft outer layer.

17 Claims, 5 Drawing Sheets

(56) References Cited

U.S. PATENT DOCUMENTS

| | | | |
|---|---|---|---|
| 2009/0236841 A1* | 9/2009 | Borges | A63C 5/044 |
| | | | 280/816 |
| 2010/0148483 A1* | 6/2010 | Kopp | A63C 5/003 |
| | | | 280/809 |
| 2012/0183737 A1* | 7/2012 | Luthardt | B32B 3/30 |
| | | | 428/161 |
| 2014/0103613 A1* | 4/2014 | Gomez | B29C 70/865 |
| | | | 280/11.19 |
| 2016/0184688 A1* | 6/2016 | Elphick | A63C 5/031 |
| | | | 280/14.25 |
| 2016/0193793 A1* | 7/2016 | Filippini | B32B 5/26 |
| | | | 428/71 |
| 2017/0259160 A1* | 9/2017 | Docter | A63C 5/006 |
| 2017/0361201 A1* | 12/2017 | Briggs | A63C 5/07 |
| 2018/0345121 A1* | 12/2018 | Goehring, Jr. | A63C 17/012 |
| 2019/0308088 A1* | 10/2019 | Shen | B27N 3/08 |

* cited by examiner

| | | |
|---|---|---|
| | TOP | 119 |
| STYRENE BUTADIENE RUBBER | 250 | |
| FIBERGLASS CLOTH | 240 | |
| CARBON NANOTUBE CLOTH | 230 | |
| FIBERGLASS CLOTH | 220 | |
| EPOXY SUPPORTED FILM ADHESIVE | 210 | |
| HONEYCOMB ALUMINUM | 200 | 108 |
| EPOXY SUPPORTED FILM ADHESIVE | 211 | |
| FIBERGLASS CLOTH | 221 | |
| CARBON NANOTUBE CLOTH | 231 | |
| FIBERGLASS CLOTH | 241 | |
| STYRENE BUTADIENE RUBBER | 251 | |
| ALUMINUM PLATE B/W TRUCKS | 118 | |
| | BOTTOM | 115 |

FIG.4

SPORT BOARD

CROSS REFERENCE TO RELATED APPLICATIONS

This application is a non-provisional patent application, which claims priority to, and benefit from, application Ser. No. 62/800,962, filed Feb. 4, 2019, entitled "SPORT BOARD", which is incorporated by reference for all purposes.

FIELD

The invention relates generally to platforms and sporting boards, and more particularly to skateboards, surfboards, etc. or any other needed platform or support, which needs to be thin, strong, and lightweight.

BACKGROUND

The current state of the art of skateboarding may be observed on television featuring the X-Games and other events. Most of the genre in this vein of skateboard competition is acrobatic and ramp/pool riding aerials, demanding a lot of balance, spatial awareness, and speed judgment agility. Gymnastics strength moves, skills and balance are not woven into the repertoire of the contestants as the level of Olympic-class training and discipline of an early age to master a high-level of gymnastic performance, is unfamiliar to the vast majority of recreational skaters. As a result, the style of freestyle gymnastics skating has not been developed or is as aesthetically exciting as big aerials on pools and ramps that are visibly pleasing to the gallery at the X-Games.

SUMMARY

The present disclosure describes a sport board or freestyle skateboard whose overhead profile includes wide-foot placement areas at the ends of the skateboard platform surface just to the rear of the rear skateboard truck (steering mechanism), and just in front of the front skateboard truck. Both "wide-foot placement" areas in the nose and tail of the board are called kick tails. The area that exists at the skateboard platform where the kick tail and skateboard trucks are mounted needs reinforcement to enhance the strength of the platform in that area because of the weight that is distributed over the board in that area to not only do freestyle tricks but to facilitate simple "curb hopping" maneuvers, end-over-end's, wheelies, 360's and multiples of 360's.

The "freestyle gymnastic board" as described herein may provide more freestyle possibilities for existing skilled riders and the neighborhood freestyle aficionado to ascend to new levels of performance in the ballet of freestyle gymnastic skating with lighter, thinner, stronger, yet a softer skateboard that is conducive to switching to riding a freestyle, gymnastic style of skateboarding. Users may use two bare feet to gain move control and sensitivity to the gymnastic performance platform riding, and execution of tricks and maneuvers parlaying one maneuver into another in a quicker mode. The user may also increase the execution and precision of maneuvers, which may be all that more impressive when the tricks begin to flow like a ballet, driving the level of freestyle gymnastic skating into an art form that is pleasing to the gallery of spectators. What is necessary to accomplish the growth of the freestyle ballet end of the sport, is that a lighter, thinner, and softer skateboard platform needs to be developed.

That is where the freestyle gymnastic board and its capabilities will be the catalyst for lifting the caliber of competitive performance for skateboarding, from a mildly athletic, balanced performance of riding a board, to one that is competitively performance-driven that rises to the level of an Olympic-judged performance international event. Two very different worlds, that of the X-Games and that of the Olympics.

Olympic gymnasts who are athletically proficient and trained in the execution of specific maneuvers on the rings, on the balance beam, or on the padded gym floor executing floor exercises, are a shoe-in for adapting their skills to the magic rolling board with a terrain that is much more varied and interesting to a spectator gallery than a mere gym floor.

A skateboard whose lightness, thin geometry, and "Durasoft" covering, will enable freestyle skaters to "feel" their board and put it through technical maneuvers in the performers' bare feet, that skate-shoed riders of today's boards can only dream about. The speed and the precision of the executed maneuvers and tricks will put freestyle gymnastic skating on a map all of its own dimension whose apparent skill and prowess can be admired by and attract the best of athletes, with gymnasts possibly cross-training into freestyle gymnastic skating. This type of skating may be going to the Olympics!

Embodiments, examples, features, aspects, and advantages of the present disclosure will become better understood with regard to the following description, appended claims and accompanying drawings.

BRIEF DESCRIPTION OF THE DRAWINGS

The foregoing aspects and the attendant aspects of the present disclosure will become more readily appreciated by reference to the following detailed description, when taken in conjunction with the accompanying drawings, wherein:

FIG. 4 illustrates a cross-section of a board, according to an embodiment; and

Reference symbols or names are used in the Figures to indicate certain components, aspects or features shown therein. Reference symbols common to more than one Figure indicate like components, aspects or features shown therein.

DETAILED DESCRIPTION

Figure 1:
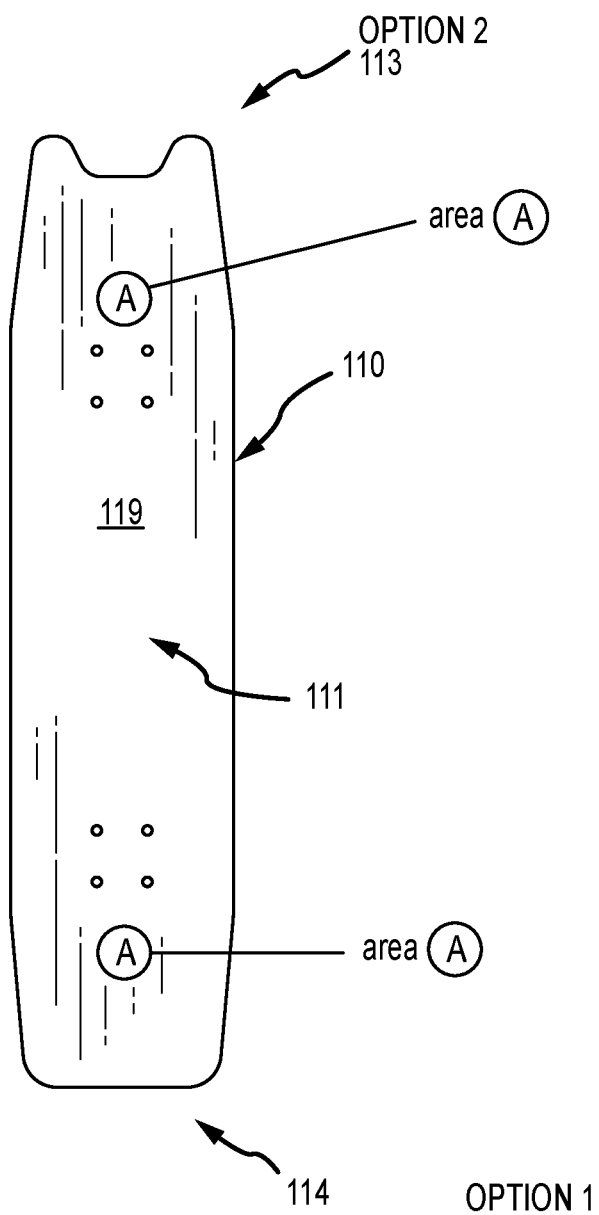
FIG. 1 is a diagram illustrating a sport board showing different options, according to an embodiment.
Figure 2:
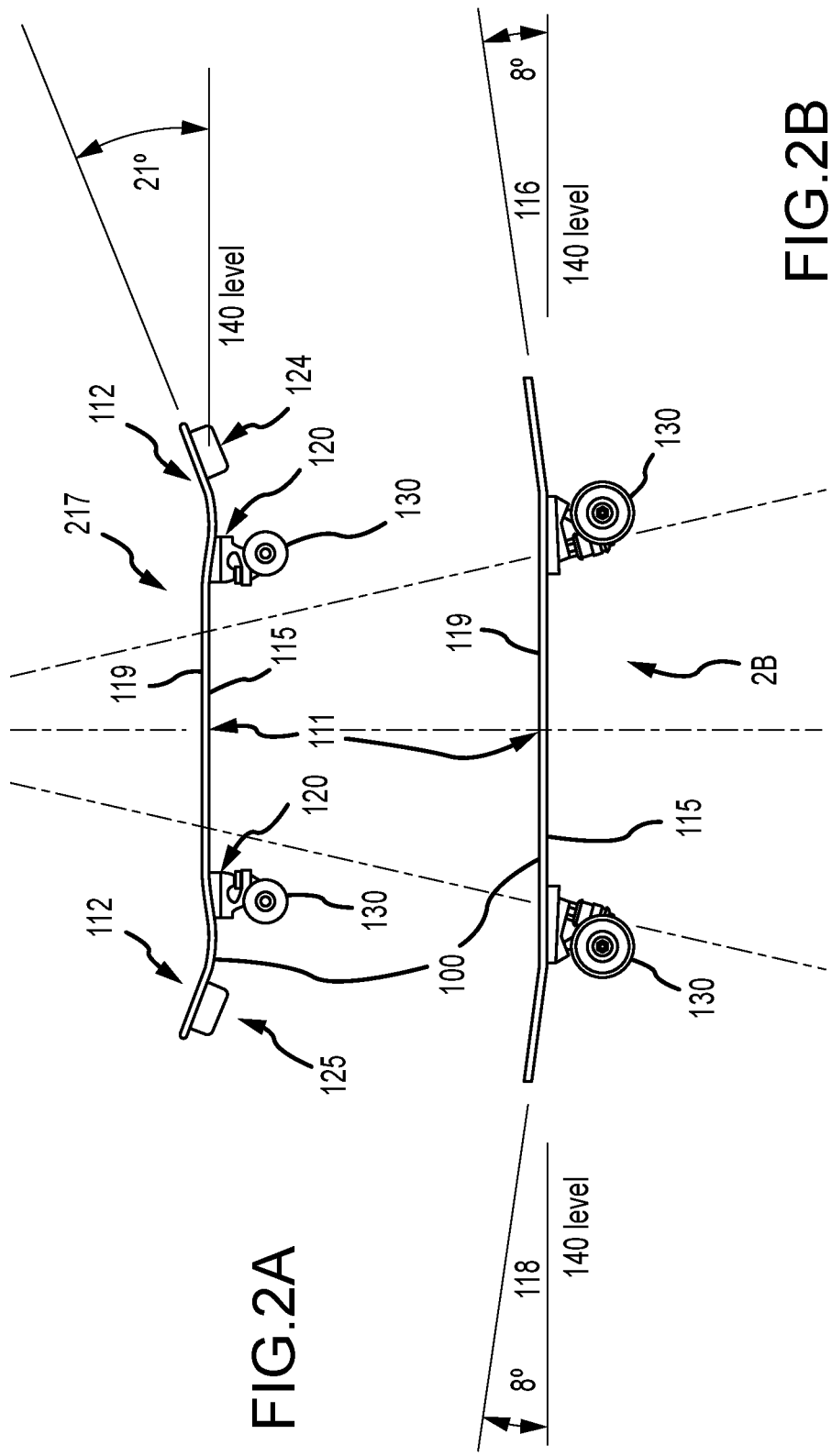
FIG. 2A illustrates a side view of a sport board showing different options, according to an embodiment.
FIG. 2B illustrates a side view of a sport board showing different options, according to an embodiment.
Figure 3:
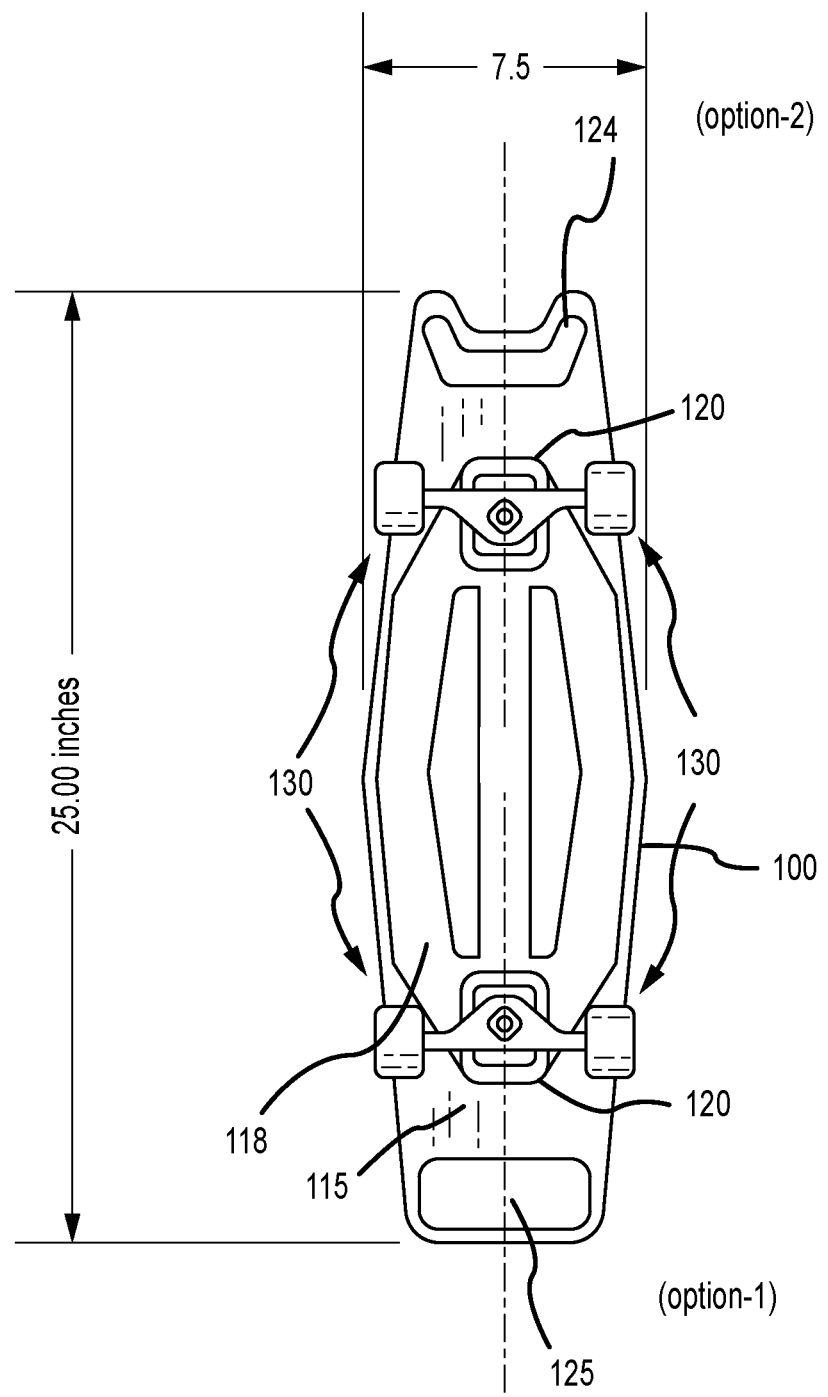
FIG. 3 illustrates a bottom view of a sport board showing different options, according to an embodiment.

In accordance with embodiments described herein, FIG. 1 shows an example of a sport board system 100. System 100 includes a board 110 which may include two or more options for kick tail 112 configurations. Board 110 may include a top portion 119, and a bottom portion 115 (FIGS. 2, 3, and 4). FIGS. 2A and 2B show a side view of trucks 120 and wheels 130. Trucks 120 may be coupled to board 110 via machine screws or other securing method or system. Wheels 130 may be rotationally coupled to trucks 120. FIG. 2 also shows two options of angular elevation of the kick tail 112 from the level 140 of the midsection 111 of board 110 (FIGS. 1, 2A, and 2B).

FIG. 3 is a bottom view of board 110, showing Option 1 and 2 for kick tail configurations.

Board 110 may include a honeycomb aluminum portion or a basis portion 200, with layers of fiberglass cloth 220, 221, then carbon nanotube fiber biaxial cloth+/−30 degree 230, 231, and then another layer of fiberglass cloth 240, 241, adhered with epoxy or other method or system. This sandwich-type construction may be called the CORE. The aluminum honeycomb or phenolic resin impregnated fiber honeycomb portion 200 may be about 0.25 inches thick (370 in FIG. 5), which may allow for the thickness of 200 (FIG. 2) or 370 to be about 0.281 inches thick versus the 0.375 thickness shown in FIG. 5. Other materials with generally high strength and generally lightweight may be used for basis portion, including wood, metal, resin, plastics, or other material and/or combinations thereof.

Because the board 110 is laminated structural facings over a light aluminum honeycomb central portion 370 (FIG. 5), and a high-strength fiber fabrics 230, 231, 240, 241 (FIG. 4) used in the structural facing on the top 320 and bottom 330 of the core 108 (FIG. 5) lends incredible strength to the board 110 (FIG. 1), when exposed to loads on top 119 in the middle portion 111 of the board 110. These loads can cause the high-strength CORE sandwich of the board 110 to go into shear. The middle portion 111 may include an area between, and possibly including a portion over, the trucks 120.

The carbon nanotube fiber structural facings that are subjected to tensile strength engineering loads on the bottom surface 115 (FIG. 2A, 2B) of the carbon nanotube fiber honeycomb sandwich laminate or "CORE" at the middle portion 111 (FIGS. 1, 2A, and 2B), and compression loads on the top surface 119 of the CORE sandwich in the same longitudinal location 111 of the skateboard 110. In the area A of the board 110 between the truck 120 and the end 112 of the board 110, the board 110 may be subject to reverse polar engineering forces when a user places a hand or foot on the kick tail area 112 of the board 110 and another foot between the trucks 120 in the middle portion 111 or over the kick tail 112 (FIGS. 1, 2A, and 2B).

Figure 5:
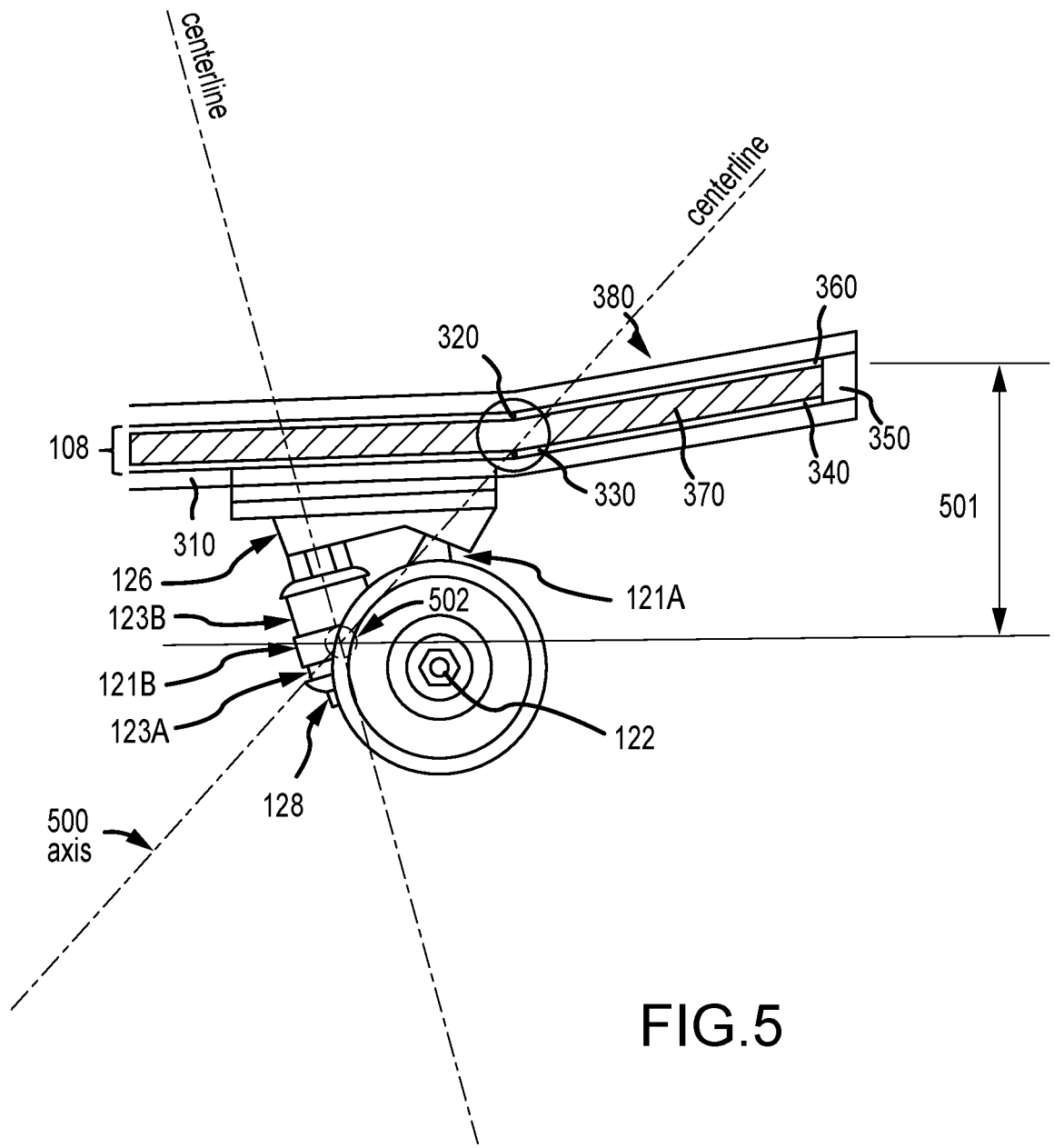
FIG. 5 illustrates an example portion of a sport board, according to an embodiment.

With foot and weight placement distributed in Area A and 111 in FIG. 1, the top portion 119 of the board may endure tensile force, while the bottom portion 115 may be subject to compression forces, which occur in Area A (FIG. 1) where in cross section in FIG. 5 of the core 108 and Durasoft covering, the top structural facing 320 goes into tensile and the bottom structural facing 330 goes into compression. To solve this engineering problem, a layer of flat weave 60 degree longitudinal angle by 120 degree lateral angle carbon nanotube fiber pre-preg structural fabric +/−30 degree with its woven asymmetry favoring the longitudinal geometry of the board 110, may be included from about two inches toward the middle 111 of the board 110 (FIG. 1) from the inboard side of the trucks 120, extending over the trucks 120 and about two inches beyond (FIGS. 2A and 2B) into the kick tail area 112 (FIG. 1, Area A) on the top 360 (FIG. 5) and bottom 340 of the structured fiber laminate facings, sandwiching the honeycomb portion 370 of FIG. 3. The extra amount of reinforcement and carbon fiber area provides more structural strength to withstand the alternating compression and tensile forces in Area A FIG. 1, when the skater is providing weight on the kick tail 112 and the middle area 111 of the board 110.

The upper 119 and lower 115 surfaces of the board 110 may be so strong that the board 110 does not break, and still remains much lighter, by at least one-half, than conventional maple or birch laminates. Conventional maple or birch laminates may break and succumb to the strength-test loads that a board 110 described herein may be able to withstand.

The skateboard steering trucks 120 may be mechanically coupled onto the CORE sandwich 108 (FIGS. 1, 2A, 2B, 3, and 5) or board 110 by the #10 round head machine screws ("RHMS") that may be guided or threaded into an insert that may be glued with epoxy into the laminate of the CORE sandwich or board 110 (FIGS. 1, 2A, 2B, 3, and 5). Other adhering methods and systems may be used.

The threaded insert or "RHMS" mounting shaft that has accommodation for securing the truck 120 location, may include devices manufactured by the Shur-lok Corporation with the designation "modified 603 series." Four for each truck 120 may be needed and the epoxy adhesive to anchor the insert permanently in the CORE 108 (FIGS. 1, 3, and 5) or board 110 (FIGS. 1, 2A, 2B, 3, and 5). That makes 8 inserts for board 110. The edge of the CORE sandwich 108 (FIGS. 4 and 5), when viewed from an overhead perspective (FIG. 1), will have a protective encapsulating bumper rail (not shown) made out of high-strength, aircraft aluminum alloy, like a 6061 alloy.

The rail may be an extruded aluminum alloy in the shape of a channel when viewed in the cross-section. The inboard edge of the U channel that encapsulates the edges of the CORE's cut laminate, will have to be sliced where the legs of the channel have to wrap around and be glued to the corners and sides of the CORE sandwich 108 (FIGS. 1, 3, 4, and 5), and keep the laminate layers from delaminating should the board get a sideways or glancing blow.

The board 110 may be wrapped in a durable, soft substance 250, 251 (FIG. 4) which has a fibrous substrate which also could have a liquid substance that saturates the fiber mesh wrapped CORE sandwich 108 and then is immersed in a mold filled with a liquid uncured soft urethane, that when cured has a soft, durable outer surface. Before the board 110 is immersed in the mold, the fiber mesh wrapped CORE sandwich 108 can be pre-saturated with a liquid soft urethane formula (similar to a skateboard wheel) before emersion in the mold to prevent bubbles and air pockets forming in the hardening or curing encapsulation process.

Another method of creating a soft, durable, flexible covering 310, 350, 380 (FIG. 5) may include using a substance that comes in sheet form. It is flexible and yet soft to the touch or flexes to the touch of the hand. It is a rubber foam sheet called "styrene butadiene rubber" or "SBR", manufactured by the Rubatex Corporation. The SBR sheets may be laminated around the CORE sandwich 108 (FIGS. 1, 2A, 2B, 3, and 5) to generally encapsulate and protect the CORE sandwich 108 and the skater's feet from the cut edges of the CORE sandwich 108. The resulting encapsulation of the CORE is a 3-layer sandwich structure covering the entire CORE 108 (FIGS. 4 and 5) of the skateboard 110 accommodating the overhead plan shape (FIG. 1) and the CORE thickness geometry by sandwiching the CORE 108 (FIG. 5) between the top SBR rubber sheet 380 and the bottom SBR rubber sheet 310, leaving the middle laminate layer of SBR 350 to cover the thickness of the CORE, acting as a kind of buffer and/or bumper for the edge of the CORE sandwich 108 (FIG. 5). Other flexible, soft durable coating may be used. The covering 250, 251 (FIG. 4) may also be sprayed on, or other methods and systems of deposition may be used.

A possible fibrous mesh reinforcing substrate (not shown) may reinforce the SBR layers on the portion of the SBR that is in contact with the CORE sandwich 108, to enhance the tear and shear strength of the laminated SBRR sheets 310, 350, 380 (FIG. 5) to protect the CORE 108 from the rider's foot placement and weight on the edge of the board as well as side glancing blows occurring in the operation of the board 110.

In addition to the soft covering 250, 251 (FIG. 4) aiding and protecting the riders bare feet and repetitive foot placement and balance, the wide foot and hand placement (hand stands) configuration in the kick tail areas 112 affords a greater amount of leveraged angular control from the rear kick tail area 112 and the rear trucks 120 when leveraging the front wheel to leave and rise above the surface of the ground in the execution of a precision maneuver and/or a performance trick standing on the kick tail 112 with one or both feet utilizing the squared off ends of the kick tail portion 112.

The kick tail 112 may incorporate on a generally 1.5 inch outer radius on the corners of the square ends, whose geometry includes a large, generally straight edge 114 (FIG. 1, Option 1) on the front and back ends 112 of the board 110 to afford a controllable surface are for the hands to grip and balance on the board 110, and allow steering of the system 100.

Another (option 2) configuration for the kick tail area may include an indentation 113 (FIGS. 1 and 3, option 2) in the edge 114 of the front and back ends of the kick tail portions 112, to facilitate a partial protection of the fingers and hand of the gymnastic freestyle skater, when executing a handstand or similar performance maneuvers necessitating the gripping of one or both ends of the board 110. Utilizing bare feet in conjunction with the indentation 113, covered with the soft, protective, covering, the skater's bare feet can more effectively "grip" the ends of the kick tail section 113 (FIGS. 1 and 3, option 2) of board 110 in the execution of lifting, or hopping the system 100 when hopping curbs or obstacles while stationary or in transit linear motion performing "helicopters" or lateral aerial 360s. Different size indentations and variations of the soft covering 250, to facilitate the rider "gripping" the board with their hands and/or feet, can be configured to fit different sized hands and feet of the rider, and the rider's preferred soft covering for the right "feel" of "texture" to fit the rider's preference or application of skating, be it gymnastic freestyle, aerial ramp maneuvers, or pool riding, and/or at skate parks.

The angle 116 of the kick tail 112 relative to the horizontal or flat portion 140 (FIGS. 2A and 2B) of the board 110 should not exceed 10 degrees to allow for a more stable and controlled ride when the user is executing tricks or performance gymnastic maneuvers involving handstands.

For a gymnastic skateboard rider to execute a hand stand and steer the skateboard at the same time, allows the rider to adjust their center of gravity over the mobile skateboard platform more efficiently when the skateboard system 100 is in motion. By manipulating the lateral, horizontal level of the board 110, thereby manipulating and steering the skateboard truck mechanisms 120 (FIG. 2A, 2B), the skateboard rider can shift their center of gravity by flexing or articulating their hand/wrist joints to steer the skateboard and effect their center of gravity over the skateboard platform 110 (FIGS. 2A, 2B). The higher the raised angle of the kick tail on the skateboard platform 110, the higher the center of effort, the greater the amount of force that must be leveraged at an elevated point to articulate or effect the lateral angular movement of the skate platform 100 (FIG. 1) for constant precision manipulation of the steering truck 120 (FIGS. 2A, 2B) to effect the rider's center of gravity over the center 111 of the board 110 (FIG. 1) when executing the precision maneuver of a handstand on the board system 100, when the rider is in motion.

Key elements in the mechanical physics of the operation are the axis of angular motion 500 (FIG. 5) of the "hanger" 121 that houses the axle 122 of the steering mechanism or truck 120 (FIG. 5), and the base pivot point 502 of the enclosing ring of the base hanger 121B that is held in place wrapping around the adjusting bolt 128 that is anchored and screwed into the base plate 126. The other end of hanger 121A, which is anchored and pivots in the base plate 126. The hanger 121 pivots around the adjusting bolt 128 and is seated on a rubber shock-absorbing bushing 123B, which is mounted on the same adjusting bolt 128. The same hanger 121 pivots along the axis of angular motion 500. The greater the base pivot point/platform distance 501, the more unstable or wobbly the steering of the skate truck 120 for the rider. The rider has to exercise more force through their wrists and hands through constant manipulation and split second correction on the guidance and steering direction of the steering mechanism or truck 120 (FIGS. 2A, 2B) to allow the rider to keep their center of gravity over the center 111 (FIG. 1) of board 110 to balance their handstand precision maneuver while in transit or motion over a gradual roadway surface incline path for the skateboard rider.

Less angle in the kick tail 112 (8 degrees, versus 20 degrees on other boards) (FIGS. 92A, 2B) on the level platform base 140 of the board 110, renders a less elevated leverage point on the kick tail area 112 (FIGS. 2A, 2B) and area 113 (FIG. 5), relative to the leverage base point 502 on the bottom of hanger 121 at the ringed enclosure 121B, culminating in a less elevated and shorter base pivot point/ platform distance 501 (FIG. 5) rendering less force to manipulate the hanger 121 along the axis of angular motion 500. This enables the rider to articulate or manipulate a split second correction to the guidance of the steering mechanism or truck 120 in the execution of a handstand. The smaller the base pivot point/platform distance 501, the less force that is required to manipulate the axle hanger and setter the system 100. That is why an 89 degree angle of the kick tail (+/−2 degrees) is important to the functionality and high end performance of this freestyle gymnastic skateboard.

A high-strength aluminum alloy portion 118 (FIGS. 3 and 4), which may be hardened with a possible anodizing treatment to the metal and coated with a non-stick anti-galling coating similar to the "Tiodize" process or a possible Teflon ceramic or titanium ceramic, non-stick coating on the high-strength aluminum strip, facilitates the protection and durability of the aluminum alloy strip or skid plate 118 (FIGS. 3 and 4) on the bottom of the skateboard 110. Other hard, relatively slick, abrasion resistant materials may be used.

The aluminum alloy skid plate 118 (FIG. 3) may be adhered or bolted adjacent the bottom 115 of the board 110 utilizing the 8 holes of the mounting machine screws holding the front and rear steering skateboard trucks (FIG. 1) to the "modified 603 series" inserts glued or adhered to the CORE sandwich 108 FIGS. 1, 2A, 2B, 3, and 4).

The aluminum alloy skid plate 118 (FIG. 3) protects the bottom layer of the SBR rubber or soft medium covering 250 involving a possible fibrous mesh reinforcing substrate from the collision-prone maneuvers of a skateboarder involving "grinds", or sliding along a longitudinal geometric shape (that may be curved) along the lateral center surface of the bottom 115 of the skateboard 110. The skid plate 118 also protects the bottom of the board 115, from curb-hopping maneuvers where the skater hops from the street level to the top of the curb or the adjacent sidewalk (or similar distance/geometry) and proceeds down the sidewalk from the street level without any marginal interruption in this "ride" or rolling motion of the travel of the skateboarder and the board 110.

"Pivot pads" or "grinding bumpers" 125 on the ends of the kick tails 112 for a generally straight end 114, or 124 (FIGS. 2A, 2B, and 3) for a kick tail with a generally indented portion 113 (FIG. 1), of the board 110, can protect the underside 115 (FIGS. 2A, 2B, and 3) of the nose and/or tail 112 of the board and the layered SBR encapsulating covering or soft medium covering 250, 251 involving a possible fibrous mesh reinforcing substrate ("FMRS") where the bottom and peripheral edges of the ends of the SBR soft covering 250 is reinforced to resist the scraping and minor collisions that induce surface and sometimes substrate damage and wear on the kick tail area 112 (FIGS. 2A, 2B, and 3).

Inserts which are glued into the CORE sandwich 108 to accept the fasteners for the pivot pads or grinding bumpers 124, 125, can conform to the modified 603 series manufactured by Shur-lok Corp., to couple the pads or bumpers 124, 125 to the underside of kick tail area 112 FIGS. 2A, 2B, and 3).

The high-strength structural facings that give the CORE sandwich 108 incredible strength allows the thickness of the core laminate (and therefore the thickness of the board 110) to be reduced from 0.375 inches to 0.250 inches. The reduction in weight is marginal, but the reduction in thickness of the skateboard platform 110 allows the rider to manipulate the board 110 far easier in the execution of performance tricks and precision maneuvers.

The reinforcement of the SBR or similar soft medium covering 250 poured and cured over the core laminate or CORE sandwich 108 can be accomplished with a polyester and/or Kevlar 29 mesh left in place on the CORE surface while a soft medium pour in place substance cures made of the same material as the skateboard wheels, a soft urethane. The durability of the urethane with a fibrous mesh substrate can lend an adequate amount of tear, abrasion, and rebound resistance for the CORE sandwich 108. SBR layered rubber sheets might be lighter, but the durability for a protective rebound-oriented covering for the CORE sandwich 108 may lie with the fibrous (polyester and/or Kevlar 29) mesh substrate encapsulated in urethane.

FIG. 5 is an exploded view of a board 110. The following table describes aspects of FIG. 5, which includes the diagram of the reverse polar engineering characteristics that are inflicted on a conventional core sandwich when the skateboard rider places their weight on Area A (FIG. 1) of the kick tail area 112 (FIG. 2A, 2B) of the board 110. Application of an additional biaxial nanotube fiber pre-preg structural fabric +/−30 degree with its woven fiber asymmetry favoring the longitudinal reinforcement of the kick tail area 112.

| | |
|---|---|
| 310 | Foam rubber layer or 251 |
| 320 | Due to fatigue bearing loads, cracks occur in the CORE sandwich if subjected to disproportionate share of stress from fatigue loads and breaks in shear along with fractured laminate layers. Kick tail 112 is then not responsive to skateboard trick executions and remains loose and flimsy as the foam rubber sheets 250 along with a mushy fractured core are the only things attaching the kick tail 112 to the rest of the board 110. |
| 330 | Tensile layer exposed to compression here |
| 340 | Bottom structural skin originally designed for tensile, unidirectional Kevlar 49 good in tensile, fails in compression at location 330 |
| 350 | Foam rubber layer or 250 |
| 360 | Upper structural skin originally designed for compression, unidirectional glass good in compression, fails in tensile at location 320. |
| 380 | Top SBR layer |

Although specific embodiments of the disclosure have been described, various modifications, alterations, alternative constructions, and equivalents are also encompassed within the scope of invention as set forth in the claims.

The specification and drawings are, accordingly, to be regarded in an illustrative rather than a restrictive sense. It will, however, be evident that additions, subtractions, deletions, and other modifications and changes may be made thereunto without departing from the broader spirit and scope of invention as set forth in the claims.

What is claimed is:

1. An apparatus configured to be used as a sport board, comprising:
    a basis portion comprising an aluminum honeycomb portion generally rectangular in shape comprising generally rounded corners;
    carbon fiber cloth and fiberglass cloth generally adhered to, and substantially encapsulating, the aluminum honeycomb portion thereby creating a core,
    wherein the core comprises a front portion, rear portion and a middle portion therebetween, wherein the front portion and rear portion are angled generally away from a bottom surface of the core at a 10 degree or less angle with respect to the middle portion to form a kicktail portion;
    a soft flexible outer layer generally encapsulating the core;
    further comprising one or more trucks adhered adjacent a bottom of the core, and adjacent the front portion and the rear portion of the core, configured to secure wheels, wherein the wheels are configured to provide rolling movement of the core;
    further comprising a generally rigid skid plate coupled to the bottom of the core, and extending between the trucks.

2. The apparatus of claim 1, wherein the skid plate is generally rectangular.

3. The apparatus of claim 1 wherein middle portion comprises outer edges, and wherein the skid plate extends generally adjacent the outer edges of the middle portion.

4. The apparatus of claim 1, wherein the core further comprises a top surface.

5. The apparatus of claim 2, further comprising a layer of carbon fiber on the top portion and the bottom portion overlapping the area where the front kicktail portion to the middle portion, and where the middle portion transition into the rear kicktail portion.

6. The apparatus of claim 1, further comprising a grinding bumper adhered adjacent the front portion or rear portion.

7. The apparatus of claim 1, wherein one of the kicktail portions comprise a general indented portion configured to facilitate placement of a hand of a user.

8. The apparatus of claim 1, wherein the middle portion of the core comprises a width greater than the width of the front and back portions of the core.

9. An apparatus configured to be used as a sport board, comprising:

a basis portion generally rectangular in shape with generally rounded corners;

carbon fiber cloth coupled to, and substantially encapsulating, the aluminum honeycomb portion thereby creating a core, wherein the core comprises a front portion, rear portion and a middle portion therebetween, wherein the front portion and rear portion are angled generally away from a bottom surface of the core at a 10 degree or less angle with respect to the middle portion;

one or more trucks adhered adjacent the bottom of the core, and adjacent the front portion and the rear portion of the core, configured to secure wheels, wherein the wheels are configured to provide rolling movement of the core;

a generally rigid skid plate portion coupled to the bottom of the core, and extending substantially the length of the middle portion; and a layer of carbon fiber on a top portion and a bottom portion of the core, overlapping the area where the front portion transitions into the middle portion, and where the middle portion transitions to the back portion.

10. The apparatus of claim 9, wherein the middle portion of the core comprises a width greater than the width of the front and back portions of the core.

11. The apparatus of claim 10, wherein middle portion comprises outer edges, and wherein the skid plate extends generally adjacent the outer edges of the middle portion.

12. The apparatus of claim 9, wherein the skid plate comprises high-strength anodized aluminum alloy.

13. The apparatus of claim 9, wherein the basis portion comprises honeycomb aluminum.

14. An apparatus configured to be used as a sport board, comprising:

a basis portion generally rectangular in shape with generally rounded corners;

carbon fiber cloth coupled to, and substantially encapsulating, the aluminum honeycomb portion thereby creating a core, wherein the core comprises a front portion, rear portion and a middle portion therebetween, wherein the front portion and rear portion are angled generally away from a bottom surface of the core at a 10 degree or less angle with respect to the middle portion;

one or more trucks adhered adjacent the bottom of the core, and adjacent the front portion and the rear portion of the core, configured to secure wheels, wherein the wheels are configured to provide rolling movement of the core;

a generally rigid skid plate portion coupled to the bottom of the core, and extending substantially the length of the middle portion; and a layer of carbon fiber on a top portion and a bottom portion of the core, overlapping the area where the front portion transitions into the middle portion, and where the middle portion transitions to the back portion, wherein the middle portion of the core comprises a width greater than the width of the front and back portions of the core, and wherein middle portion comprises outer edges, and wherein the skid plate extends generally adjacent the outer edges of the middle portion.

15. The apparatus of claim 14, wherein the basis portion comprises honeycomb aluminum.

16. The apparatus of claim 1, wherein one of the front or back portions comprise a general indented portion configured to facilitate placement of a hand of a user.

17. The apparatus of claim 9, wherein the skid plate comprises high-strength anodized aluminum alloy.

\* \* \* \* \*